United States Patent
Kuroda et al.

(10) Patent No.: US 7,972,734 B2
(45) Date of Patent: Jul. 5, 2011

(54) PROCESS FOR PRODUCING POLYMER ELECTROLYTE EMULSION

(75) Inventors: Ryuma Kuroda, Ishikawa (JP); Shin Saito, Tsukuba (JP); Hiroyuki Kurita, Tsukuba (JP); Kentaro Masui, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 193 days.

(21) Appl. No.: 12/309,000

(22) PCT Filed: Jun. 29, 2007

(86) PCT No.: PCT/JP2007/063523
§ 371 (c)(1),
(2), (4) Date: Dec. 31, 2008

(87) PCT Pub. No.: WO2008/004643
PCT Pub. Date: Jan. 10, 2008

(65) Prior Publication Data
US 2009/0208810 A1    Aug. 20, 2009

(30) Foreign Application Priority Data

Jul. 4, 2006 (JP) .................................. 2006-184245
Jul. 4, 2006 (JP) .................................. 2006-184246

(51) Int. Cl.
*B01D 61/00*    (2006.01)
(52) U.S. Cl. ............ 429/409; 429/492; 524/1; 210/650; 210/652
(58) Field of Classification Search ................ 429/409, 429/492; 524/1
See application file for complete search history.

(56) References Cited

U.S. PATENT DOCUMENTS

| 4,012,303 A | 3/1977 | D'Agostino et al. |
| 4,605,685 A | 8/1986 | Momose et al. |
| 5,294,372 A | 3/1994 | Kochem et al. |
| 5,525,436 A | 6/1996 | Savinell et al. |
| 5,580,735 A | 12/1996 | Malick et al. |
| 5,817,718 A | 10/1998 | Nezu et al. |

(Continued)

FOREIGN PATENT DOCUMENTS

JP    5-98021 A    4/1993

(Continued)

OTHER PUBLICATIONS

Machine Translation of JP 2001-026695 A.*

(Continued)

*Primary Examiner* — David Wu
*Assistant Examiner* — Vu A Nguyen
(74) *Attorney, Agent, or Firm* — Foley & Lardner LLP

(57) ABSTRACT

A process for producing a polymer electrolyte emulsion having the following steps (1) and (2) is provided. Step (1): a step of dissolving a polymer electrolyte in a solvent comprising a good solvent for the polymer electrolyte to prepare a polymer electrolyte solution having a polymer electrolyte concentration of 0.1 to 10% by weight. Step (2): a step of mixing the polymer electrolyte solution 10 obtained in the step (1), and a poor solvent for the polymer electrolyte at a ratio of 4 to 99 parts by weight of the poor solvent based on 1 part by weight of the polymer electrolyte solution. In addition, a process for producing a polymer 15 electrolyte emulsion comprising separating a polymer electrolyte dispersion in which a polymer electrolyte particle is dispersed in a dispersing medium, with a membrane is provided.

5 Claims, 1 Drawing Sheet

U.S. PATENT DOCUMENTS

| | | | |
|---|---|---|---|
| 6,136,893 A | 10/2000 | Yamashita et al. | |
| 2001/0041279 A1 | 11/2001 | Terahara et al. | |
| 2004/0101730 A1 | 5/2004 | Hirano et al. | |

FOREIGN PATENT DOCUMENTS

| | | |
|---|---|---|
| JP | 7-805 A | 1/1995 |
| JP | 9-102322 | 4/1997 |
| JP | 9-110982 | 4/1997 |
| JP | 9-111000 A | 4/1997 |
| JP | 11-503262 | 3/1999 |
| JP | 11-116679 | 4/1999 |
| JP | 2001-26695 A | 1/2001 |
| JP | 2001-250567 A | 9/2001 |
| JP | 2003-31232 A | 1/2003 |
| JP | 2003-171470 A | 6/2003 |
| JP | 2004-89976 | 3/2004 |
| JP | 2004-319353 A | 11/2004 |
| JP | 2005-132996 A | 5/2005 |
| JP | 2006-31970 A | 2/2006 |
| WO | WO 98/36017 A1 | 8/1998 |
| WO | WO 2004/088673 A1 | 10/2004 |

OTHER PUBLICATIONS

Bordi et al. J. Phys. Chem. 1991, 95, 4883-4889.*
Lee et al. Langmuir 2005, 21, 10797-10802.*
International Search Report received in application No. PCT/JP2007/063523 (2 pgs.).
Cabasso et al., "Synthesis and Characterization of Polymers with Pendent Phosphonate Groups", Journal of Applied Polymer Science, vol. 18, No. 7, pp. 1969-1986, 1974.
Gallagher, Skip, "Synthesis and Characterization of Phosphonate Containing Polysiloxanes", Polymer Preprints, vol. 41, No. 1, pp. 70-71, 2000.

* cited by examiner

PROCESS FOR PRODUCING POLYMER ELECTROLYTE EMULSION

TECHNICAL FIELD

The present invention relates to a process for producing a polymer electrolyte emulsion in which a polymer electrolyte particle containing a polymer electrolyte is dispersed. More particularly, the present invention relates to a process for producing a polymer electrolyte emulsion suitable for manufacturing a member for a fuel cell.

BACKGROUND ART

A polymer having a hydrophilic group such as a sulfonic acid group, a carboxyl group, and a phosphoric acid group, that is, a polymer electrolyte is utilized as a proton conducting membrane of a fuel cell, or a binder for complexing with platinum-supported carbon to form a catalyst layer. As such the polymer electrolyte include Nafion (registered trade mark) manufactured by Dupont, Aciplex (registered trade mark) manufactured by Asahi Chemical Industry Co., Ltd., and Flemion (registered trade mark) manufactured by Asahi Glass Company, and these are sold in a form in which a solid microparticle consisting of a fluorine-based polymer electrolyte is dispersed in a dispersing medium. However, since such the fluorine-based polymer electrolyte has been desired to be substituted with a polymer electrolyte due to request of discharge of a fluorine compound generated by degradation to the environment, and the lower cost.

For example, Japanese Patent Application Laid-Open (JP-A) No. 2005-132996 discloses an aqueous dispersion comprising sulfonated polyorganosiloxane, and indicates that such the dispersion imparts a film excellent in water resistance and film forming property.

In addition, JP-A No. 2004-319353 discloses that a solid electrolyte membrane obtained by mixing a solid electrolyte consisting of a fine particle having an ionic group on a surface with other polymer electrolyte soluble in a solvent, and casting the solution affords a solid electrolyte membrane which suppresses methanol crossover of a direct methanol fuel cell.

DISCLOSURE OF THE INVENTION

The dispersion in which the polymer electrolyte is a hydrocarbon-based polymer, disclosed in JP-A No. 2005-132996 or JP-A No. 2004-319353, was insufficient in dispersibility probably due to a small dissociation degree of sulfonic acid as compared with the previous fluorine-based polymer electrolyte. For this reason, addition of an emulsifier was necessary for improving dispersibility, this emulsifier remained in a solid electrolyte material obtained from this, and reduction in properties due to remaining of such the emulsifier, particularly, reduction in electric generation performance was feared.

An object of the present invention is to provide a process for producing a polymer electrolyte emulsion having better dispersing stability without using the emulsifier.

In addition, another object of the present invention is to provide a process for producing a polymer electrolyte emulsion which can manifest high electric generation property when used as an ion conducting membrane which is a member for a fuel cell, or a binder for an electrode.

In order to solve the aforementioned problems, the present inventors intensively studied and, as a result, completed the present invention. That is, the present invention provides a process for producing a polymer electrolyte emulsion of the following [1] to [11].

[1] A process for producing a polymer electrolyte emulsion having the following steps (1) and (2).

Step (1): a step of dissolving a polymer electrolyte in a solvent comprising a good solvent for the polymer electrolyte to prepare a polymer electrolyte solution having a polymer electrolyte concentration of 0.1 to 10% by weight.

Step (2): a step of mixing the polymer electrolyte solution obtained in the step (1), and a poor solvent for the polymer electrolyte at a ratio of 4 to 99 parts by weight of the poor solvent based on 1 part by weight of the polymer electrolyte solution.

[2] The process according to [1], wherein the step (1) is a step of placing the polymer electrolyte solution in the poor solvent for the polymer electrolyte.

[3] The process according to [1] or [2], wherein letting relative permittivity of the good solvent to be $\epsilon 1$, and relative permittivity of the poor solvent for the polymer electrolyte to be $\epsilon 2$, a difference ($|\epsilon 1 - \epsilon 2|$) is 7 or more but not exceeding 100.

[4] The process according to [1] or [2], wherein letting relative permittivity of the good solvent to be $\epsilon 1$, and relative permittivity of the poor solvent for the polymer electrolyte to be $\epsilon 2$, a difference ($|\epsilon 1 - \epsilon 2|$) is 20 or more but not exceeding 100.

[5] The process according to any one of [1] to [4], wherein the good solvent is at least one kind selected from the group consisting of N-methyl-2-pyrrolidone, N,N-dimethylformamide, N,N-dimethylacetamide and dimethyl sulfoxide.

[6] A process for producing a polymer electrolyte emulsion comprising separating a polymer electrolyte dispersion in which a polymer electrolyte particle is dispersed in a dispersing medium, with a membrane.

[7] The process according to [6], wherein the membrane is a dialysis membrane or an ultrafiltration membrane.

[8] The process according to [6], wherein the membrane is a dialysis membrane.

[9] The process according to any one of [6] to [8], wherein a polymer electrolyte contained in the polymer electrolyte particle is a polymer electrolyte in which a content of a fluorine atom in its elementary composition is 15% by weight or less.

[10] The process according to any one of [6] to [9], wherein the polymer electrolyte dispersion is a dispersion obtained via the following steps (1) and (2).

Step (1): a step of dissolving a polymer electrolyte in a solvent comprising a good solvent for the polymer electrolyte to prepare a polymer electrolyte solution.

Step (2): a step of mixing the polymer electrolyte solution obtained in the step (1), and a poor solvent for the polymer electrolyte.

[11] The process according to [10], wherein the good solvent is at least one kind selected from the group consisting of N-methyl-2-pyrrolidone, N,N-dimethylacetamide, N,N-dimethylformamide and dimethyl sulfoxide.

In addition, the present invention provides a polymer electrolyte emulsion of the following [12] to [16].

[12] A polymer electrolyte emulsion obtained by the process according to any one of [1] to [11].

[13] A polymer electrolyte emulsion wherein a polymer electrolyte particle is dispersed in a dispersing medium, wherein the dispersing medium contains substantially no emulsifier.

[14] The polymer electrolyte emulsion according to [12], wherein a polymer electrolyte particle is dispersed in a dispersed medium, and the dispersing medium contains substantially no emulsifier.

[15] The polymer electrolyte emulsion according to any one of [12] to [14], wherein a volume average particle diameter obtained by a dynamic light scattering method is 100 nm to 200 μm.

[16] The polymer electrolyte emulsion according to any one of [12] to [15], wherein a content of the good solvent for the polymer electrolyte is 200 ppm or less.

Further, the present invention provides the following [17] to [19].

[17] An electrode for a polymer electrolyte fuel cell, obtained by using the polymer electrolyte emulsion according to any one of [12] to [16].

[18] A membrane electrode assembly comprising the electrode for a polymer electrolyte fuel cell according to [17].

[19] A polymer electrolyte fuel cell comprising the membrane electrode assembly according to [18].

According to the present invention, a polymer electrolyte emulsion having high dispersing stability can be simply produced without using an emulsifier, being industrially useful. In addition, by using the polymer electrolyte emulsion obtained by the present invention in a material of forming an ion conductive membrane, or a binder for an electrode, particularly, in the fuel cell filled, since reduction in properties due to the emulsifier is not generated, a membrane electrode assembly excellent in electric generation property, therefore, a fuel cell can be afforded.

EXPLANATION OF SYMBOLS

Figure 1:
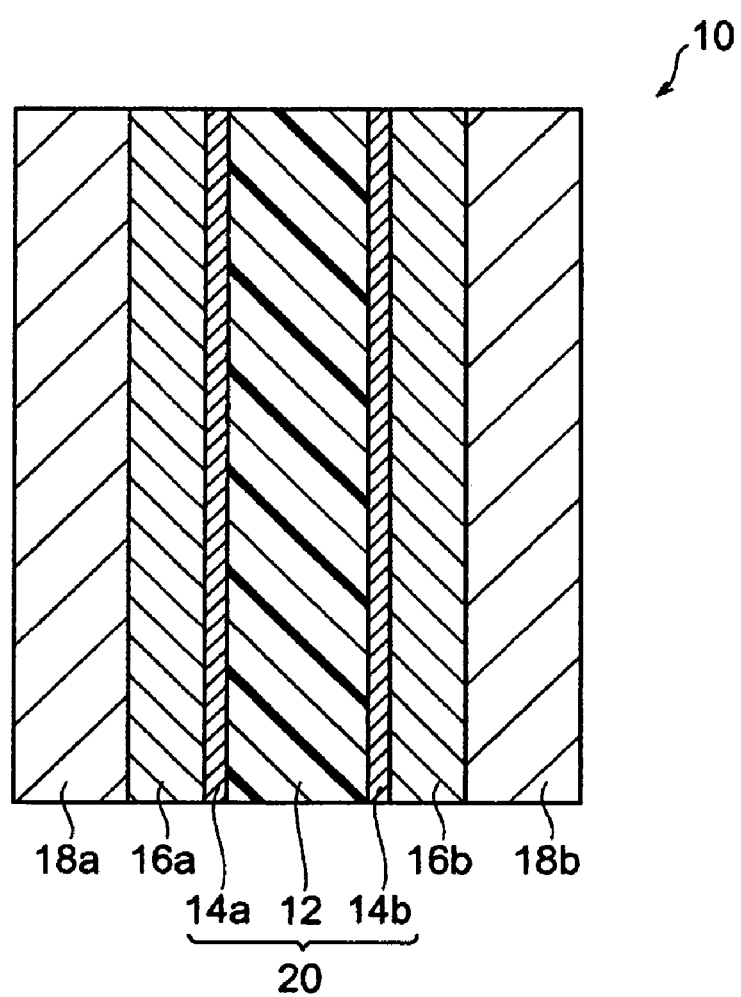
FIG. 1 is a view schematically showing a cross-sectional construction of a fuel cell of a preferable embodiment.

10 . . . fuel cell, 12 . . . ion conductive membrane,
16a, 16b . . . catalyst layer, 16a, 16b . . . gas diffusion layer,
18a, 18b . . . separator, 20 . . . MEA

BEST MODE FOR CARRYING OUT THE INVENTION

A preferable embodiment in the present invention will be successively explained below.
<Preparation Step>

As a step of the process for producing a polymer electrolyte emulsion of the present invention [above mentioned [1]], a polymer electrolyte is dissolved in a solvent comprising a good solvent for the polymer electrolyte to prepare a polymer electrolyte solution [step (1)]. The good solvent is not particularly limited as far as the polymer electrolyte to be used can be dissolved, but a solvent comprising a good solvent in which the polymer electrolyte to be used can be dissolved at 0.1 g or more based on 100 g of a solvent at 25° C. is adopted. Herein, definition of the "good solvent" means a solvent in which 0.1 g or more of the polymer electrolyte is soluble in 100 g of a solvent at 25° C.

The polymer electrolyte is a polymer having an ion exchange group in a molecule, a preferable polymer electrolyte will be explained layer, examples of the good solvent used for such the preferable polymer electrolyte include N,N-dimethylacetamide, N,N-dimethylformamide, dimethyl sulfoxide, N-methyl-2-pyrrolidone and the like, and two or more kinds of them may be used by mixing. These good solvents also have an advantage that solubility is great for a block copolymer having a segment having an ion exchange group, and a segment without substantially ion exchange group, which is a suitable polymer electrolyte described later.

Regarding a method of dissolving the polymer electrolyte in a solvent comprising a good solvent, a temperature, a pressure and the like are not particularly limited, but usually under the condition of a normal temperature (around 20 to 30° C.) and a normal pressure (around 1 atm), this is simple for production, being preferable. A dissolution time for preparing the polymer electrolyte solution can be optimized depending on a kind of a polymer electrolyte and a solvent to be applied, and it is preferable to obtain an endpoint of a preparation step by visually determining that there is no insoluble of the polymer electrolyte in a polymer electrolyte solution obtained by mixing the solvent with the polymer electrolyte, that is, a polymer electrolyte solution is uniform, or the like. Alternatively, an insoluble in the polymer electrolyte solution (insoluble residue related to a polymer electrolyte, an insoluble contaminant mixed from an apparatus etc.) may be removed by operation such as filtration and the like.

A concentration of the polymer electrolyte in the polymer electrolyte solution is in a range of 0.1 to 10% by weight, more preferably in a range of 0.5 to 5% by weight. When the concentration of the polymer electrolyte is less than 0.1% by weight, since the polymer electrolyte is dispersed (dissolved) in a dispersing medium at a molecular level, there is a tendency that it becomes difficult to form an emulsion. On the other hand, when the concentration is more than 10% by weight, there is a tendency that a viscosity of the polymer electrolyte solution is increased, and operation such as solution supply and the like becomes difficult.

It is preferable that in the preparation step, a solvent used upon preparation of the polymer electrolyte solution contains a good solvent to such an extent that the polymer electrolyte to be applied can be sufficiently dissolved. By doing so, a polymer electrolyte molecule is present in the polymer electrolyte solution in the state where its molecular chain is relatively expanded. When such the polymer electrolyte molecule is mixed with a dispersing medium (poor solvent) described later to form a polymer electrolyte particle, a site having relatively high affinity for the dispersing medium in the polymer electrolyte molecule is easily oriented on a particle surface, and a site having relatively low affinity is easily oriented in the interior of the particle, thereby, by controlling the surface state of the polymer electrolyte particle, a polymer electrolyte emulsion having better dispersing stability can be produced. Herein, the polymer electrolyte solution in which the polymer electrolyte is sufficiently dissolved means dissolution to such an extent that a particle can pass through a filter of a pore diameter of 0.2 μm.

In addition, when a part of the polymer electrolyte is precipitated in the polymer electrolyte solution, during a course of obtaining a polymer electrolyte particle by placing into the poor solvent, the precipitated polymer electrolyte functions as a seed, a particle diameter of the polymer electrolyte particle easily becomes non-uniform, and there is a fear that a polymer electrolyte emulsion having a suitable average particle diameter described later is obtained with difficulty. Also, in order to avoid such the inconvenience, it is preferable that a solvent used upon preparation of the polymer electrolyte solution contains a good solvent to such an extent that the polymer electrolyte to be applied can be sufficiently dissolved, and it is particularly preferable that the polymer electrolyte solution is prepared using substantially only a good solvent. The "substantially only a good solvent" does not exclude a minor amount of impurities other than a good solvent, which is contained in the good solvent without intension.

<Mixing Step>

Subsequently, the polymer electrolyte solution obtained as described above and a poor solvent of an applied polymer electrolyte are mixed [step (2)]. Herein, the poor solvent is a solvent in which a polymer electrolyte dissolved in the polymer electrolyte solution is insoluble or hardly soluble and, upon mixing of the polymer electrolyte solution and the poor solvent, the polymer electrolyte is precipitated in a particle manner to form a polymer electrolyte solution, and the polymer electrolyte particle is dispersing-stabilized, thereby, an emulsion is formed. Such the poor solvent is a solvent in which a polymer electrolyte dissolved in 100 g of the solvent is 0.05 g or less at 25° C. Like this, the good solvent which is a constituent component of the polymer electrolyte solution, and the poor solvent which forms the polymer electrolyte particle can form an emulsion by selecting those solvents having different solubility for a polymer electrolyte to be used. It is preferable that the good solvent and the poor solvent having a greater difference in solubility for the polymer electrolyte to be used are selected. In addition, it is preferable that the good solvent and the poor solvent are compatible with each other.

To specifically exemplify the poor solvent, water, alcohols such as methanol, ethanol and 2-propanol, non-polar organic solvents such as hexane and toluene, acetone, methyl ethyl ketone, methylene chloride, ethyl acetate, or a mixed solvent of them is used. Among them, from a viewpoint that reduction in environmental load when industrially used, water or a solvent containing water as a main component is preferably used.

A mixing method is not particularly limited, but may be any of a method of placing the polymer electrolyte solution in the dispersing medium and a reverse method of placing the dispersing medium in the polymer electrolyte solution and, from a viewpoint that dispersing stability of a polymer electrolyte particle generated by precipitation of the polymer electrolyte is made to be better, the former method is preferable and, inter alia, a method of successively placing the polymer electrolyte solution, that is, adding dropwise the polymer electrolyte solution is more preferable.

Further, it is preferable to stir the poor solvent when the polymer electrolyte solution is added dropwise. The condition of such stirring can be optimized depending on a kind of the polymer electrolyte to be precipitated, a kind of the good solvent and the poor solvent to be applied to the polymer electrolyte solution, and a kind and a shape of a mixing device and, as one example, when a 3 L glass Erlenmeyer flask (bottom diameter; 18 cm) and a Teflon (registered trade mark) stirrer (length; 4 cm) are used as a mixing device, the polymer electrolyte emulsion having better dispersing stability is obtained by adding dropwise the polymer electrolyte solution at 3 to 5 g/min while the dispersing medium is stirred at around 500 to 700 rpm.

A temperature and a pressure in the mixing step are also not particularly limited, but they are arbitrarily selected in such a range that transpiration of the good solvent in the polymer electrolyte solution, deterioration of the polymer electrolyte, transpiration of the poor solvent and the like are not generated, and the condition of a normal temperature (around 20 to 30° C.) as a temperature, and a normal pressure (around 1 atom) is preferable since it is simple for production.

An amount of the poor solvent to be used is 4 to 99 wt-folds an amount of the polymer electrolyte solution. From a viewpoint that the polymer electrolyte particle is effectively precipitated, the poor solvent is preferably 6 to 99 wt-folds, more preferably 9 to 99 wt-folds the polymer electrolyte solution. When an amount of the poor solvent to be used is less than 4 wt-folds, there is a tendency that the precipitated polymer electrolyte particle is gelled, and precipitation and aggregation are easily generated and, on the other hand, when the amount is exceeds 99 wt-folds, a volume efficiency is reduced, being not preferable.

<Polymer Electrolyte>

Then, a preferable polymer electrolyte used in the present invention will be explained.

The polymer electrolyte is a polymer having an ion exchange group in a molecule as described above, and examples of such the ion exchange group include cation exchange groups such as a sulfonic acid group ($-SO_3H$), a carboxyl group ($-COOH$), a phosphoric acid group ($-PO(OH)_2$), a phosphinic acid group ($-POH(OH)$), a sulfonimide group ($-SO_2NHSO_2-$), a phenolic hydroxy group (-Ph(OH) (Ph represents a phenyl group)) and the like, and anion exchange groups such as a primary amine group to a tertiary amine group and the like. Among them, a polymer electrolyte having a sulfonic acid group or a phosphoric acid group as an ion exchange group is more preferable, and a polymer electrolyte having a sulfonic acid group as an ion exchange group is particularly preferable.

Examples of a representative of a preferable polymer electrolyte include (A) a polymer electrolyte in which a sulfonic acid group and/or a phosphonic acid group are introduced in a polymer having a main chain consisting of an aliphatic hydrocarbon; (B) a polymer electrolyte in which a sulfonic acid group and/or a phosphonic acid group are introduced in a polymer having a main chain having an aromatic ring; (C) a polymer electrolyte in which a sulfonic acid group and/or a phosphonic acid group are introduced in a polymer containing substantially no carbon atom on a main chain, such as polysiloxane, and polyphosphazene; (D) a polymer electrolyte in which a sulfonic acid group and/or a phosphonic acid group are introduced in a copolymer consisting of any two or more kinds of repeating units selected from repeating units constituting a polymer before introduction of a sulfonic acid group and/or a phosphonic acid group of (A) to (C); a polymer electrolyte in which a main chain or a side chain contains a nitrogen atom, and an acidic compound such as sulfuric acid and phosphoric acid is introduced with an ionic bond.

Examples of the polymer electrolyte of (A) include polyvinylsulfonic acid, polystyrenesulfonic acid, poly(α-methylstyrene)sulfonic acid and the like.

The polymer electrolyte of (B) may be such that a main chain is interrupted with a hetero atom such as an oxygen atom and the like, and examples include a polymer electrolyte in which a sulfonic acid group is introduced in a homopolymer, such as polyether ether ketone, polysulfone, polyether sulfone, poly(arylene/ether), polyimide, poly((4-phenoxybenzoyl)-1,4-phenylene), polyphenylenesulfide, polyphenylquinoxalene and the like, sulfoarylated polybenzimidazole, sulfoalkylated polybenzimidazole, sulfoalkylated polybenzimidazole (JP-A No. 9-110982), phosphonated poly (phenylene ether) (J. Appl. Polym. Sci., 18, 1969 (1974)) and the like.

In addition, examples of the polymer electrolyte of (C) include polyphosphazene with a sulfonic acid group introduced therein, polysiloxane having a phosphoric acid group (Polymer Prep., 41, No. 1, 70 (2000)) and the like.

The polymer electrolyte of (D) may be a polymer electrolyte in which a sulfonic acid group and/or a phosphonic acid group are introduced in a random copolymer, or a polymer electrolyte in which a sulfonic acid group and/or a phosphonic acid group are introduced in an alternate copolymer, or a polymer electrolyte in which a sulfonic acid group and/or a phosphonic acid group are introduced in a block copolymer. Examples of the polymer electrolyte in which a sulfonic acid group is introduced in a random copolymer include a sulfonated polyether sulfone-dihydroxybiphenyl copolymer described in JP-A No. 11-116679.

Among the polymer electrolyte of (D), examples of a block having a sulfonic acid group and/or a phosphonic acid group in a block copolymer include a block having a sulfonic acid group and/or a phosphonic acid group described in JP-A No. 2001-250567.

In addition, the block copolymer preferably has a segment having an ion exchange group, a segment without substantially ion exchange group, and may be a block copolymer having each one of these segments, or a block copolymer having two or more of any one of segments, or a multiblock copolymer having two or more of both segments.

Examples of the polymer electrolyte of (E) include polybenzimidazole containing phosphoric acid described in Japanese Patent Application National Publication (Laid-Open) No. 11-503262, and the like.

Among the above-exemplified polymer electrolytes, when the block copolymer explained as the polymer electrolyte of (D) is used, since a polymer electrolyte emulsion more excellent in dispersing stability is obtained, it is preferable that the block copolymer is contained as the polymer electrolyte to be applied to the process of the present invention.

Among the above-exemplified polymer electrolytes, it is preferable that the polymer electrolyte to be applied to the present invention is a polymer electrolyte in which a content of a fluorine atom is 15% by weight or less in its elementary composition (hereinafter, referred to as "non-fluorine-based polymer electrolyte"; a content of a fluorine atom in elementary composition exceeding 15% by weight is referred to as "fluorine-based polymer electrolyte"). Such the fluorine-based polymer electrolyte was bad in dispersibility in an aqueous medium, and needed an emulsifier for stabilizing an emulsion probably due to a smaller dissociation degree of a sulfonic acid group as compared with the previous fluorine-based polymer electrolyte. The present inventors found out that when an emulsion containing an emulsifier like this is used as a binder in manufacturing a catalyst layer of a fuel cell, the emulsifier is adsorbed or poisoned onto a surface of platinum which is a catalyst component, remarkably damaging properties of the fuel cell. The above-exemplified preferable polymer electrolyte dispersion is a dispersion in which a polymer electrolyte particle consisting of a non-fluorine-based polymer electrolyte is dispersed in a dispersing medium, and a polymer electrolyte emulsion obtained by membrane separation enables to improve electric generation performance when used in a catalyst layer for a fuel cell or the like, in addition to high dispersing stability.

Further, the polymer electrolyte emulsion provided by the present invention enables to give an electrode for a fuel cell excellent in electric generation performance for even a non-fluorine-based polymer electrolyte, while high dispersibility is maintained, even without substantially using an emulsifier, and is expected to contribute to improvement in electric generation performance also for the previous fluorine-based polymer electrolyte. As such the fluorine-based polymer electrolyte, in addition to the commercially available fluorine-based polymer electrolyte described in Background Art, there are exemplified a sulfonic acid-type polystyrene-graft-ethylene-tetrafluoroethylene copolymer (ETFE) constituted of a main chain made by copolymerization of a fluoride carbide-based vinyl monomer and a hydrocarbon-based vinyl monomer described in JP-A No. 9-102322, and a hydrocarbon-based side chain having a sulfonic acid group described in JP-A No. 9-102322, and a resin obtained by graft-polymerizing a copolymer of a fluorine carbide-based vinyl monomer and a hydrocarbon-based vinyl monomer with α,β,β-trifluorostyrene, and introducing a sulfonic acid group with a sulfonating agent such as chlorosulfonic acid, fluorosulfonic acid and the like therein, obtained by according to U.S. Pat. No. 4,012,303 or U.S. Pat. No. 4,605,685.

<Good Solvent/Poor Solvent>

The good solvent and the poor solvent applied to the polymer electrolyte solution in the present invention can be appropriately selected depending on a kind of the polymer electrolyte to be used as described above and, preferably, letting relative permittivity of the good solvent constituting the polymer electrolyte solution to be $\epsilon1$, and relative permittivity of the poor solvent to be $\epsilon2$, a difference in those relative permittivity ($|\epsilon1-\epsilon2|$) is preferably 7 or more but not exceeding 100, further preferably 20 or more but not exceeding 100. In addition, the expression in a parenthesis indicates an absolute value of a difference in relative permittivity ($\epsilon1-\epsilon2$). When a difference in relative permittivity is in the aforementioned range, since a solvent of the polymer electrolyte solution and a dispersing medium are easily miscible with each other, the precipitated polymer electrolyte particle is gelled, and precipitation and aggregation are generated with difficulty, dispersing stability is excellent, being preferable. Both of the ∈1 and ∈2 are relative permittivity at a measuring temperature of 23° C. and, when a plurality of solvents is used as the good solvent or the dispersing medium, relative permittivity can be obtained by utilizing the known additive property from its mixing weight ratio, and relative permittivity of a solvent species to be mixed. As one example, when two kinds of solvents are employed, and the solvents are a solvent A and a solvent B, respectively, relative permittivity ∈M of a mixed solvent can be obtained by the following equation.

$$\epsilon M = [a \times \epsilon A + b \times \epsilon B]$$

(wherein a and b each represent a weight fraction of a solvent A and a solvent B, a+b is 100% by weight, and ∈A and ∈B each represent relative permittivity of a solvent A and a solvent B)

Relative permittivity of these solvents can be selected from relative permittivity described in the known reference, for example, Solvent Handbook (Shozo Asamura/Zinichiro Tokura/Shin Okawahara/Keiju Kumano/Manabu Imo, Kodansha Ltd., published in 1976) and the like and, also in the case of a mixed solvent, a preferable solvent can be easily selected by using the additive property.

<Removal Step>

By the process of the present invention having a preparation step and a mixing step explained above, a polymer electrolyte emulsion can be obtained and, from a viewpoint that dispersing stability of the polymer electrolyte emulsion is not reduced with time, it is preferable to remove the good solvent (good solvent used in polymer electrolyte solution) remaining in the resulting polymer electrolyte emulsion.

As a removal method, when a boiling point of the good solvent and that of the poor solvent are compared, and a boiling point of the good solvent is lower, a distillation off method can be adopted. In addition, when a molecular volume of the good solvent and that of the poor solvent are compared, and a molecular volume of the good solvent is smaller, membrane separation such as dialysis and the like can be adopted. Among these removal methods, membrane separation is particularly preferable, and details will be described later.

A removal rate of the good solvent remaining in the polymer electrolyte emulsion is not particularly limited, but letting a total amount of good solvents used upon preparation of the polymer electrolyte solution to be Ws, and letting a total weight of good solvents to be removed to be Wr, when expressed by a removal rate defined by Wr/Ws, 80% or more is preferable, 90% or more is further preferable, and it is more preferable that a removal rate is substantially 100%. When expressed as a content of the good solvent remaining in the polymer electrolyte emulsion obtained via such the removal step, the good solvent is preferably 200 ppm or less, more preferably 100 ppm or less based on a total weight of the polymer electrolyte emulsion, and it is particularly preferable that the good solvent is not substantially contained, that is, the good solvent is removed to such an extent that the good solvent is not detected by the known analysis means.

<Membrane Separation>

Then, regarding membrane separation to be applied to the present invention [above mentioned [6]], a preferably embodiment will be explained.

Herein, a membrane separation method is classified into a precise filtration method, an ultrafiltration method, a dialysis method, an electrodialysis method, a reverse osmosis method, and nanofiltration in an order of a size of a substance to be separated, precise filtration, ultrafiltration and nanofiltration are conveniently classified depending on a pore diameter of a membrane to be used, precise filtration arrests a particle greater than 0.1 μm, ultrafiltration arrests a particle in a range of 0.1 μm to 2 nm, and nanofiltration arrests a particle at an extent smaller than 2 nm. And, reverse osmosis moves a solvent in a direction reverse to an osmotic pressure difference by pressuring. In the present invention, any of these separation means can be used, suitably, membrane separation using a dialysis membrane and/or membrane separation using an ultrafiltration membrane is preferable and, among them, when membrane separation using a dialysis membrane is used, this is more preferably. Among the dialysis membrane, a regenerated cellulose membrane can be suitably used.

The method using a dialysis membrane is characterized in that treatment can be performed without applying a pressure as compared with the filtration method, and is also characterized in that a membrane thickness can be made to be very thin. There are many kinds of pore diameters, from an extent of an ultrafiltration membrane to an extent of a reverse osmosis membrane. As a material of the dialysis membrane, regenerated cellulose, cellulose acetate, and polyacrylonitrile are used. Any of them can be used better in the present invention.

As preferable implementing condition of the dialysis method, a first phase in which a regenerated cellulose membrane is used, and a polymer electrolyte dispersion is placed in one isolated from such the membrane, and a second phase in which a dispersing medium used in the polymer electrolyte dispersion to be applied is placed in the other, are arranged. The good solvent used in preparation of a polymer electrolyte solution, an unreacted monomer component at preparation of the polymer electrolyte, and other impurities permeate through a membrane, and moves to a second phase side from a first phase side, and a dispersing medium is moved to a first phase side from a second phase side, thereby, in the polymer electrolyte dispersion, impurities and the dispersing medium are exchanged, and are purified to obtain a suitable polymer electrolyte emulsion. It is preferable that such the membrane separation is usually performed at an around normal temperature (20 to 30° C.), since it is simple.

In the membrane separation, what is separated from the first phase side is presumed to deteriorate electric generation performance when applied to a member for a fuel cell. Although not clear, as one of them, the good solvent of the polymer electrolyte used in preparation of the polymer electrolyte dispersion is considered. It was found out that, when the dialysis membrane being a preferable membrane separation is used, the good solvent can be removed at 80% by weight or more letting a total amount of the good solvent contained in the polymer electrolyte dispersion to be 100% by weight. And, as a removal rate of such the good solvent, the aforementioned preferable range can be easily attained. In addition, in a content of the good solvent remaining in the polymer electrolyte emulsion, the aforementioned preferable range can be easily attained to obtain a polymer electrolyte emulsion excellent in dispersing stability.

<Polymer Electrolyte Emulsion>

The polymer electrolyte emulsion obtained by the process of the present invention is such that a polymer electrolyte emulsion in which a particle contained in the emulsion is highly dispersing-stabilized even without using the emulsifier which has previously been used widely. A volume average particle diameter obtained by measurement based on a dynamic light scattering method of a particle contained in the emulsion is preferably 100 nm to 200 μm, more preferably 150 nm to 10 μm, further preferably 200 nm to 1 μm. Herein, the particle present in the polymer electrolyte emulsion includes all of a particle consisting of the polymer electrolyte, a particle consisting of an additive which was added if necessary, and a particle consisting of the polymer electrolyte and the additive which was added if necessary, and the average particle diameter is an average particle diameter obtained by measuring the polymer electrolyte emulsion obtained by the process of the present invention using a dynamic light scattering method.

A concentration of the polymer electrolyte related to the polymer electrolyte emulsion of the present invention is suitably 0.1 to 10% by weight. Herein, the concentration of the polymer electrolyte is defined as a value obtained by dividing a total weight of the polymer electrolyte applied to the polymer electrolyte emulsion by a total weight of the emulsion. The concentration of the polymer electrolyte is preferably 0.5 to 5% by weight, further preferably 1 to 2% by weight. When the concentration of the polymer electrolyte is within the aforementioned range, since a large amount of a solvent is not necessary for forming a film, this is effective and, since coating property is also excellent, this is preferable.

Further, in addition to the polymer electrolyte, other component may be contained depending on desired properties, in such a range that poisoning of a catalyst is not generated, when applied to an electrode for a fuel cell. Examples of such the other component include additives such as plasticizers, stabilizers, adhesion aids, releasing agents, water retaining agents, inorganic or organic particles, sensitizers, leveling agents, coloring agents and the like, and the presence or the absence of catalyst poisoning ability of these components can be determined by the known method by a cyclic voltammetry method.

Like this, when used as a constituent component of an electrode of the fuel cell, during operation of the fuel cell, a peroxide is generated in the catalyst layer, this peroxide is changed into a radical species while diffusing, and this is moved to the ion conductive membrane connected with the electrode to deteriorate an ion conducting material (polymer electrolyte) constituting the ion conductive membrane, in some cases. In this case, in order to avoid such the inconvenience, it is preferable to add a stabilizer which can impart radical resistance, to the polymer electrolyte emulsion.

These other components can be applied to the process of the present invention by dissolving them together with the polymer electrolyte in a solvent in the preparation step, to prepare the polymer electrolyte solution.

In addition, such other components may be contained in the polymer electrolyte particle constituting the polymer electrolyte emulsion, or may be dissolved in the dispersing medium, or may be present as a fine particle consisting of other component, separate from the polymer electrolyte particle.

<Utility>

The polymer electrolyte emulsion obtained via the method of the present invention can afford a film having a good precision by various film molding methods. As the film molding method, for example, cast film molding, spray coating, brush coating, roll coater, flow coater, bar coater, and dip coater can be used. A coated film thickness is different depending on utility, and a dry film thickness is usually 0.01 to 1,000 μm, preferably 0.05 to 500 μm.

This polymer electrolyte emulsion can be suitably used as a dry film in a proton conductive film for a fuel cell, as an electrode for a fuel cell by complexing with carbon or a platinum catalyst, or as a modifier or an adhesive by coating on a substrate surface.

An entity in which an electrode called catalyst layer containing a catalyst such as platinum promoting an oxidation reduction reaction of hydrogen and the air is formed on both sides of the polymer electrolyte membrane is called membrane electrode assembly (hereinafter, referred to as "MEA") and, further, a form having a gas diffusion layer for effectively supplying a gas to the catalyst layer on an outer side of both catalyst layers in the MEA is usually called membrane electrode gas diffusion layer assembly (hereinafter, may be referred to as "MEGA").

Such the MEA is manufactured using a method of forming the catalyst layer directly on the polymer electrolyte membrane, a method of forming the catalyst layer on a flat plate supporting substrate, transferring this onto the polymer electrolyte membrane, and peeling the supporting substrate, or the like. Alternatively, examples include a method of forming the catalyst layer on a substrate which is to be a gas diffusion layer, such as a carbon paper and the like, connecting this with the polymer electrolyte membrane to manufacture MEA in a form of MEGA.

The polymer electrolyte emulsion obtained by the method of the present invention can be applied to various utilities, a representative of which is a primer, an adhesive, a binder resin, and a polymer solid electrolyte membrane like this.

For example, when MEA is formed by coating a catalyst ink obtained by blending the polymer electrolyte emulsion obtained in the present invention, and platinum-supported carbon on an ion conductive membrane, MEA extremely excellent in electric generation property can be obtained. Alternatively, when MEA is formed by coating the polymer electrolyte emulsion obtained in the present invention on an ion conductive membrane, placing thereon a particle in which an electrolyte and platinum-supported carbon are complexed, before drying of the emulsion coated membrane, MEA extremely excellent in electric generation property can be obtained. Alternatively, by using the polymer electrolyte emulsion of the present invention as an adhesive upon connecting of the membrane electrode assembly and the gas diffusion layer, MEA extremely excellent in electric generation property can be also obtained.

Then, a fuel cell equipped with MEA obtained by the polymer electrolyte emulsion of the present invention will be explained.

FIG. 1 is a view schematically showing a cross-sectional construction of a fuel cell of a preferable embodiment. As shown in FIG. 1, in a fuel cell 10-, there are catalyst layers 14a, 14b on both sides of an ion conductive membrane 12 so as to hold this, and this is MEA20 obtained by the process of the present invention. Further, on catalyst layers of both sides, gas diffusion layers 16a, 16b are provided, respectively, and separators 18a, 18b are formed on the gas diffusion layers.

Herein, an entity provided with MEA20 and gas diffusion layers 16a, 16b is the aforementioned MEGA.

Herein, catalyst layers 14a, 14b are a layer functioning as an electrode layer in a fuel cell, and one of them is an anode catalyst layer, and the other is a cathode catalyst layer.

Gas diffusion layers 16a, 16b are provided so as to hold both sides of MEA20, and facilitate diffusion of a raw material gas to catalyst layers 14a, 14b. It is preferable that the gas diffusion layers 16a, 16b are constituted of a porous material having electric conductivity. For example, a porous carbon non-woven fabric and carbon paper are preferable since they can effectively transport a raw material gas to catalyst layers 14a, 14b.

Separators 18a, 18b are formed of a material having electron conductivity, and examples of such the material include carbon, resin-molded carbon, titanium, stainless and the like. It is preferable that such the separators 18a, 18b (not shown) are such that a groove being a flow path of a fuel gas or the like is formed on catalyst layers 14a, 14b sides.

And, the fuel cell 10 can be obtained by holding the aforementioned MEGA with one pair of separators 18a, 18b, and connecting them.

The fuel cell of the present invention is not necessarily limited to a fuel cell having the aforementioned construction, but may have arbitrarily different construction in such a range that the gist is not departed.

In addition, the fuel cell 10 may be a fuel cell having the aforementioned structure, which has been sealed with a gas sealant or the like. Further, a plurality of the fuel cells 10 of the aforementioned structure may be connected in series, which may be put into practice as a fuel cell stack. And, the fuel cell having such the structure can be operated as a polymer electrolyte fuel cell when a fuel is hydrogen, and can be operated as a direct methanol fuel cell when a fuel is an aqueous methanol solution.

The present invention will be explained below by way of Examples, but the present invention is not limited by the Examples at all.

(Method of Measuring Ion Exchange Capacity)

The polymer electrolyte to be subjected to measurement was formulated into a membrane using a solution casting method. A dry weight of this membrane was obtained using a halogen water percentage meter set at a heating temperature of 105° C. Then, this membrane was immersed in 5 mL of a 0.1 mol/L aqueous sodium hydroxide solution and, further, 50 mL of ion exchanged water was added, followed by allowing to stand for 2 hours. Thereafter, 0.1 mol/L hydrochloric acid was gradually added to the solution in which the membrane was immersed, thereby, tituration was performed to obtain a neutralization point. And, from the dry weight of the membrane and an amount of hydrochloric acid necessary for the neutralization, an ion exchange capacity (unit: meq/g) of the membrane was calculated.

(Method of Measuring Weight Average Molecular Weight)

Measurement by gel permeation chromatography (GPC) was performed, and polystyrene conversion was performed to calculate a weight average molecular weight. The measuring condition of GPC is as follows.

GPC Condition

GPC measuring apparatus manufactured by TOSOH HLC-8220

Column manufactured by Shodex. Two of AT-80Ms were connected in series.

Column temperature 40° C.

Mobile phase solvent DMAc (LiBr was added to 10 mmol/dm$^3$)

Solvent flow rate 0.5 mL/min (Method of Measuring Average Particle Diameter)

An average particle diameter of the polymer electrolyte particle present in the produced emulsion was measured using a dynamic light scattering method (concentrated-system particle diameter analyzer, FPAR-1000 [manufactured by Otsuka Electronics Co., Ltd.]). A measuring temperature is 30° C., an accumulated time is 30 min, and a wavelength of laser used in measurement is 660 nm. The resulting data was analyzed by a CONTIN method using an analysis software (FPAR System, VERSION 5.1.7.2) attached to the aforementioned apparatus to obtain a scattering intensity distribution, and a particle diameter having highest frequency was adopted as an average particle diameter.

Production Example 1

Synthesis of dipotassium 4,4'-difluorodiphenylsulfone-3,3'-disulfonate

To a reactor equipped with a stirrer were added 467 g of 4,4'-difluorodiphenylsulfone and 3500 g of 30% fuming sulfuric acid to react them at 100° C. for 5 hours. The resulting reaction mixture was cooled, and added to a large amount of ice water and, further, 470 mL of a 50% aqueous potassium hydroxide solution was added dropwise thereto.

Then, the precipitated solid was collected by filtration, washed with ethanol, and dried. The resulting solid was dissolved in 6.4 L of deionized water, a 50% aqueous potassium hydroxide solution was added to adjust a pH to 7.5, and 460 g of potassium chloride was added. The precipitated solid was collected by filtration, washed with ethanol, and dried.

Thereafter, the resulting solid was dissolved in 2.9 L of dimethyl sulfoxide (hereinafter, referred to as "DMSO"), insoluble inorganic salts were removed by filtration, and the residue was further washed with 300 mL of DMSO. To the resulting filtrate was added dropwise 6.0 L of a solution of ethyl acetate/ethanol=24/1, and the precipitated solid was washed with methanol, and dried at 100° C. to obtain 482 g of a solid of dipotassium 4,4'-difluorodiphenylsulfone-3,3'-disulfonate.

Production Example 2

Production of Polymer Electrolyte A

Synthesis of Polymer Compound Having Sulfonic Acid Group

Under argon atmosphere, to a flask equipped with an azeotropic distillation device were added 9.32 parts by weight of dipotassium 4,4'-difluorodiphenylsulfone-3,3'-disulfonate obtained in Production Example 1, 4.20 parts by weight of potassium 2,5-dihydroxybenzenesulfonate, 59.6 parts by weight of DMSO, and 9.00 parts by weight of toluene, and an argon gas was bubbled for 1 hour while these were stirred at room temperature.

Thereafter, to the resulting mixture was added 2.67 parts by weight of potassium carbonate, and the mixture was heated and stirred at 140° C. to perform azeotropic dehydration.

Thereafter, heating was continued while toluene was distilled off, to obtain a DMSO solution of a polymer compound having a sulfonic acid group.

A total heating time was 14 hours. The resulting solution was allowed to cool to room temperature.

(Synthesis of Polymer Compound without Substantially Ion Exchange Group)

Under argon atmosphere, to a flask equipped with an azeotropic distillation device were added 8.32 parts by weight of 4,4'-difluorodiphenylsulfone, 5.36 parts by weight of 2,6-dihydroxynaphthalene, 30.2 parts by weight of DMSO, 30.2 parts by weight of N-methyl-2-pyrrolidone (hereinafter, referred to as "NMP"), and 9.81 parts by weight of toluene, and an argon gas was bubbled for 1 hour while stirring at room temperature.

Thereafter, to the resulting mixture was added 5.09 parts by weight of potassium carbonate, and the mixture was heated and stirred at 140° C. to perform azeotropic dehydration. Thereafter, heating was continued while toluene was distilled off. A total heating time was 5 hours. The resulting solution was allowed to cool to room temperature to obtain an NMP/DMSO mixed solution of a polymer compound without substantially ion exchange group.

(Synthesis of Block Copolymer)

While the resulting NMP/DMSO mixed solution of a polymer compound without substantially ion exchange group was stirred, to this were added a total amount of the DMSO solution of a polymer compound having a sulfonic acid group, 80.4 parts by weight of NMP, and 45.3 parts by weight of DMSO, and a block copolymerization reaction was performed at 150° C. for 40 hours.

The resulting reaction solution was added dropwise to a large amount of 2 N hydrochloric acid, followed by immersion for 1 hour. Thereafter, the produced precipitate was filtered, and immersed again in 2 N hydrochloric acid for 1 hour. The resulting precipitate was filtered, washed with water, and immersed in a large amount of hot water at 95° C. for 1 hour. Then, this solution was dried at 80° C. for 12 hours to obtain a polymer electrolyte A which is a block copolymer. An ion exchange capacity of the resulting polymer electrolyte A was 1.9 meq/g, and a weight average molecular weight was $4.2 \times 10^5$.

A structure of this polymer electrolyte A is shown below. The description of "block" in the following formula indicates that the structure has each one or more of blocks having a sulfonic acid group and blocks having no ion exchange group. And, n and m denote a copolymerization mole fraction of each structural unit.

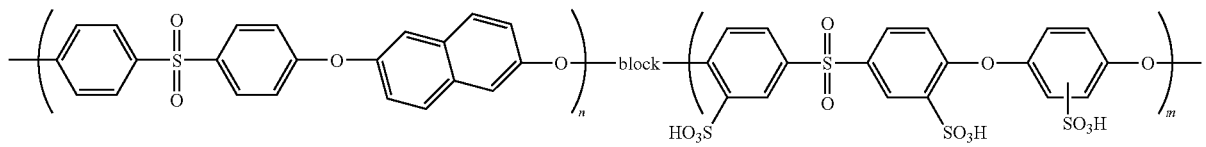

Production Example 3

Production of Polymer Electrolyte B

Under argon atmosphere, in a flask equipped with an azeotropic distillation device were placed 600 ml of DMSO, 200 mL of toluene, 26.5 g (106.3 mmol) of sodium 2,5-dichlorobenzenesulfonate, 10.0 g of the following polyether sulfone which is a terminal chloro-type (Sumikaexcel PES5200P manufactured by SUMITOMO CHEMICAL CO., LTD., $Mn=5.4 \times 10^4$, $Mw=1.2 \times 10^5$), and 43.8 g (280.2 mmol) of 2,2'-bipyridyl, and the mixture was stirred. Thereafter, a bath temperature was raised to 150° C., toluene was heated to distill off, thereby, water in the system was azeotropic-dehydrated, and this was cooled to 60° C. Then, to this was added 73.4 g (266.9 mmol) of bis(1,5-cyclooctadiene)nickel (0), a temperature was raised to 80° C., and this was stirred at the same temperature for 5 hours. After allowing to cool, the reaction solution was poured into a large amount of 6 mol/L hydrochloric acid, thereby, a polymer was precipitated and filtered. Thereafter, an operation of washing with 6 mol/L hydrochloric acid/filtration was repeated a few times, and the polymer was washed with water until the filtrate became neutral, and dried under reduced pressure to obtain 16.3 g of the following objective polyarylene (space) block copolymer. This is called polymer electrolyte B (following formula). And, the description of "block" in the following formula indicates that the structure has each one or more of blocks having a sulfonic acid group and blocks having no ion exchange group.

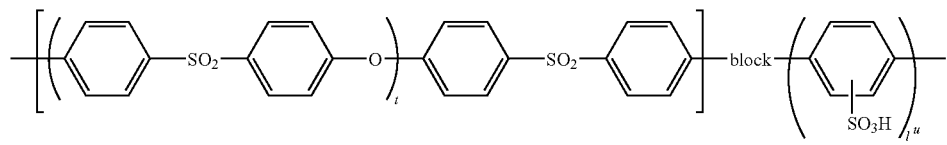

An ion exchange capacity of the resulting polymer electrolyte B was 2.3 meq/g, and a weight average molecular weight was $2.7 \times 10^5$. And, t and u denote an average polymerization degree of a repeating unit in a parenthesis constituting each block.

Production Example 4

Production of Stabilizer Polymer D (Synthesis of Polymer a)

A 2-L separable flask equipped with a reduced pressure azeotropic distillation device was replaced with nitrogen, and 63.40 g of bis-4-hydroxydiphenylsulfone, 70.81 g of 4,4'-dihydroxybiphenyl, and 955 g of NMP were added to a uniform solution. Thereafter, 92.80 g of potassium carbonate was added, and dehydration was performed at 135° C. to 150° C. for 4.5 hours under reduced pressure while NMP was distilled off. Thereafter, 200.10 g of dichlorodiphenylsulfone was added, followed by a reaction at 180° C. for 21 hours.

After completion of the reaction, the reaction solution was added dropwise to methanol, and the precipitated solid was filtered and recovered. The recovered solid was further via methanol washing, water washing, and hot methanol washing, and dried to obtain 275.55 g of a polymer a. A structure of this polymer a is shown below. The polymer a had a weight average molecular weight in terms of polystyrene as measured by GPC of 18000, and a ratio of n and m obtained from an integrated value of NMR measurement was n:m=7:3. The following expression of "random" indicates that a structural unit forming the following polymer a is randomly copolymerized.

(Synthesis of Polymer b)

A 2-L separable flask was replaced with nitrogen, and 1014.12 g of nitrobenzene, and 80.00 g of the polymer a were added to a uniform solution. Thereafter, 50.25 g of N-bromosuccinimide was added, and the mixture was cooled to 15° C. Subsequently, 106.42 g of 95% concentrated sulfuric acid was added dropwise over 40 minutes, followed by a reaction at 15° C. for 6 hours. After 6 hours, 450.63 g of a 10 w % aqueous sodium hydroxide solution, and 18.36 g of sodium thiosulfate were added while cooled to 15° C. The 2-L separable flask was replaced with nitrogen, and 1014.12 g of nitrobenzene, and 80.00 g of the polymer a were added to a uniform solution. Thereafter, 50.25 g of N-bromosuccinimide was added, and the mixture was cooled to 15° C. Subsequently, 106.42 g of 95% concentrated sulfuric acid was added dropwise over 40 minutes, followed by a reaction at 15° C. for 6 hours. After 6 hours, 450.63 g of a 10 wt % aqueous sodium hydroxide solution, and 18.36 g of sodium thiosulfate were added while cooled to 15° C. Thereafter, this solution was added dropwise to methanol, and the precipitated solid was filtered and recovered. The recovered solid was via methanol washing, water washing and, again, methanol washing, and dried to obtain 86.38 g of a polymer b.

(Synthesis of Polymer c)

A 2-L separable flask equipped with a reduced pressure azeotropic distillation device was replaced with nitrogen, and 116.99 g of dimethylformamide, and 80.07 g of the polymer b were added to a uniform solution. Thereafter, dehydration under reduced pressure was performed for 5 hours while dimethylformamide was distilled off. After 5 hours, the material was cooled to 50° C., 41.87 g of nickel chloride was added, a temperature was raised to 130° C., and 69.67 g of triethyl phosphite was added dropwise, followed by a reaction at 140° C. to 145° C. for 2 hours. After 2 hours, 17.30 g of triethyl phosphite was further added, followed by a reaction at 145° C. to 150° C. for 3 hours. After 3 hours, the reaction was cooled to room temperature, a mixed solution of 1161 g of water and 929 g of ethanol was added dropwise, and the precipitated solid was filtered, and recovered. To the recovered solid was added water, and the material was sufficiently ground, washed with 5 wt % hydrochloric acid, and washed with water to obtain 86.83 g of a polymer c.

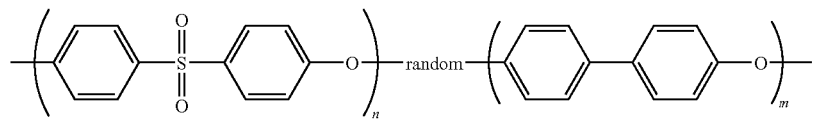

(Synthesis of Polymer d)

A 5 L of separable flask was replaced with nitrogen, 1200 g of a 35 w % hydrochloric acid aqueous solution, 550 g of water, and 75.00 g of the polymer c were added, and the mixtures stirred at 105° C. to 110° C. for 15 hours. After 15 hours, the reaction was cooled to room temperature, and 1500 g of water was added dropwise. Thereafter, the solid in the system was filtered, and recovered, and the resulting solid was washed with water, and washed with hot water. After drying, 72.51 g of an objective polymer d. A content of phosphorus obtained from elementary analysis of the polymer d was 5.91%, and a value of x (the number of phosphonic acid groups per 1 biphenylileneoxy group) calculated from an elementary analysis value was 1.6.

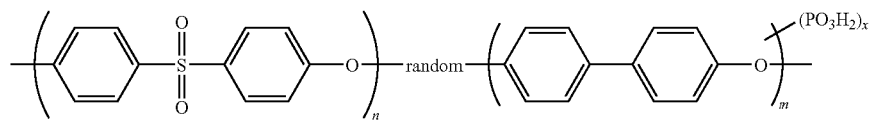

Example 1-1

In N-methyl-2-pyrrolidone (hereinafter, referred to as "NMP") were dissolved 0.9 g of the polymer electrolyte B obtained in Production Example 3, and 0.1 g of the polymer d obtained in Production Example 4 to 1.0 part by weight, to prepare 100 g of a polymer electrolyte solution. On the other hand, 900 g of distilled water was placed into a 3 L Erlenmeyer flask, and this was stirred at a stirring rate of 500 rpm (stirring wing: manufactured by Teflon (registered trademark), length 4 cm). To this dispersing medium was added dropwise 100 g of the polymer electrolyte solution obtained as described above at an addition rate of 3 to 5 g/min using a burette to dilute it, to obtain a dispersion in which the polymer electrolyte was precipitated as a particle. Then, this dispersion was sealed into a cellulose tube for dialysis membrane dialysis (UC36-32-100 manufactured by Sanko Junyaku Co., Ltd.: fraction molecular weight 14,000), this was exposed to flowing water at a temperature of 25° C. and a pressure of 1 atm for 72 hours to remove NMP from the dispersion (removal rate 99.9%). After NMP removal, the dispersion was concentrated to a concentration of the polymer electrolyte of 1.6 wt % using an evaporator, to prepare a polymer electrolyte emulsion. Results of dispersing stability and storage stability, as well as a remaining amount of NMP are shown in Table 1. Assessment of dispersing stability and storage stability was performed by the following method, and a remaining amount of NMP was measured by gas chromatography mass spectroscopy (GC-MASS).
<Assessment Method>
(Assessment of Dispersing Stability)
Into a 100 cc screw tube made of a glass was placed 50 g of a polymer electrolyte emulsion, the tube was sealed, and allowed to stand at 25° C. for 1 day, the dispersing state was visually observed, and dispersing stability was determined by the following criteria.
○: Precipitation and increase in a viscosity were not seen, and the initial state was maintained.
Δ: A small amount of precipitate, or increase in a viscosity was observed.
x: The emulsion was separated into a transparent supernatant and a white precipitate, or the whole system was gelled.
(Assessment of Storage Stability)
Into a 100 cc screw tube made of a glass was placed 80 g of a polymer emulsion, the tube was sealed, and allowed to stand at 25° C. for 3 days, the dispersion state was visually observed, and storage stability was determined according to the following criteria.
○: Precipitation and increase in a viscosity were not seen, and the initial state was maintained.
Δ: A small amount of precipitate, or increase in a viscosity was observed.
x: The emulsion was separated into a transparent supernatant and a white precipitate, or the whole system was gelled.

Example 1-2

According to the same manner as that of Example 1-1 except that a solvent for preparing a polymer electrolyte solution was changed from NMP to dimethyl sulfoxide, a polymer electrolyte emulsion was produced. Results of dispersing stability and storage stability, as well as a remaining amount of dimethyl sulfoxide are shown in Table 1. A remaining amount of dimethyl sulfoxide was obtained by gas chromatography mass spectroscopy (GC-MASS).

Comparative Example 1-1

According to the same manner as that of Example 1-1 except that a concentration of the polymer electrolyte of the polymer electrolyte solution was 3.0% by weight, and distilled water which is a dispersing medium was 100 g, an experiment was performed. Results of dispersing stability and storage stability are shown in Table 1.

Comparative Example 1-2

According to the same manner as that of Example 1-1 except that a concentration of the polymer electrolyte of the polymer electrolyte solution was 13.5 wt %, an experiment was performed. Results of dispersing stability and storage stability are shown in Table 1.

TABLE 1

| | Example 1-1 | Example 1-2 | Comparative Example 1-1 | Comparative Example 1-2 |
|---|---|---|---|---|
| Polymer electrolyte solution concentration/wt % | 1.0 | 1.0 | 3.0 | 13.5 |
| Use amount of dispersing medium/ weight-fold (based on polymer electrolyte solution weight) | 9 | 9 | 1 | 9 |
| $|\epsilon_1 - \epsilon_2|$ | 46.3 | 29.4 | 46.3 | 46.3 |
| Dispersing stability | ○ | ○ | X Gelling | X Gelling |
| Storage stability | ○ | ○ | X Gelling | X Gelling |
| Solvent remaining amount (ppm) | 4 | 10 | — | — |

Example 2-1

Preparation of Polymer Electrolyte Emulsion

In N-methylpyrrolidone (NMP) were dissolved 0.9 g of the polymer electrolyte obtained in Production Example 3, and 0.1 g of the polymer d obtained in Production Example 4, which is a stabilizer, to prepare 100 g of a 1 wt % solution. Then, 100 g of this polymer electrolyte solution was added dropwise to 900 g of distilled water at an addition rate of 3 to 5 g/min to dilute the polymer electrolyte solution. This diluted polymer electrolyte solution was sealed into a cellulose tube for dialysis membrane dialysis (UC36-32-100 manufactured by Sanko Junyaku Co., Ltd.: fraction molecular weight 14,000), and this was exposed to flowing water to perform membrane separation treatment. The polymer electrolyte solution after treatment was concentrated to a concentration of 2.0 wt % using an evaporator to prepare a polymer electrolyte emulsion. An average particle diameter of this polymer electrolyte emulsion was 394 nm. In addition, when a remaining amount of NMP was measured by gas chromatography mass spectrometry (GC-MASS), it was found to be 4 ppm.

(Method of Manufacturing Ion Conductive Membrane)

The polymer electrolyte A obtained in Production Example 2 was dissolved in N-methylpyrrolidone to a concentration of 13.5 wt % to prepare a polymer electrolyte solution. Then, this polymer electrolyte solution was added dropwise to a glass plate. Then, the polymer electrolyte solution was uniformly spread on the glass plate using a wire coater. Thereupon, a coating thickness was controlled using the wire coater having a clearance of 0.25 mm. After coating, the polymer electrolyte solution was dried at 80° C. at a normal pressure. Then, the resulting membrane was immersed in 1 mol/L hydrochloric acid, washed with ion-exchange water, and further dried at a normal temperature to obtain an ion conductive membrane having a thickness of 30 μm.

(Manufacturing of Mea)

Anode Side

Into 5.0 mL of a commercially available Nafion 5 wt % solution (manufactured by Aldrich) was placed 0.696 g of platinum-supported carbon supported 50% by weight of platinum (SA50BK, manufactured by N.E. Chemcat Co. Ltd.), and 11 mL of ethanol was further added. The resulting mixture was ultrasound-treated for 1 hour, and stirred with a stirrer for 5 hours to obtain a catalyst ink. Subsequently, according to the method described in JP-A No. 2004-089976, the catalyst ink was coated on a region of 5.2 cm square at a central part of one side of the ion conductive membrane. A distance from a discharge outlet to the membrane was set to be 6 cm, and a stage temperature was set to be 75° C. After eight times overlapping coating, the sample was allowed to stand on the stage for 15 hours to remove a solvent, to form a catalyst layer. From a concentration of the catalyst layer, and a coating weight, 0.6 mg/cm$^2$ platinum was arranged on an anode catalyst layer.

Cathode Side

Into 2.561 g of the polymer electrolyte emulsion was placed 1.000 g of platinum-supported carbon supported 50% by weight of platinum (SA50BK, manufactured by N.E. Chemcat Co., Ltd.), and 16.87 g of ethanol was further added. The resulting mixture was ultrasound-treated for 1 hour, and stirred with a stirrer for 5 hours to obtain a catalyst ink. Subsequently, according to the method described in JP-A No. 2004-089976, the catalyst ink was coated on a region of 5.2 cm square at a central part on a surface on a side opposite to a surface on which the anode catalyst layer of the ion conductive membrane was formed. A distance from a discharge outlet to the membrane was set to be 6 cm, and a stage temperature was set to be 75° C. After eight times overlapping coating, the sample was allowed to stand on the stage for 15 minutes to remove a solvent, to form a catalyst layer. From a composition of the catalyst layer and a coating weight, MEA was obtained in which 0.6 mg/cm$^2$ of platinum was arranged on a cathode catalyst layer.

(Manufacturing of Cell of Fuel Cell)

Using a commercially available JARI standard cell, a cell of a fuel cell was manufactured. That is, on both outer sides of a membrane-electrode assembly obtained using the polymer electrolyte membrane of each Example or Comparative Example, a carbon cloth which was to be a gas diffusion layer was arranged, a carbon separator on which a groove for a gas path was cutting-processed was disposed on an outer side thereof, an electric collector and an endplate were arranged on an outer side thereof in this order, and these were secured with a bolt, thereby, a cell of a fuel cell having an effective membrane area of 25 cm$^2$ was assembled.

(Electric Generation Test)

While the resulting each cell of a fuel cell was retained at 80° C., humidified hydrogen was supplied to an anode, and the humidified air was supplied to a cathode, respectively. Thereupon, a back pressure at a gas outlet of the cell was adjusted to 0.1 MPaG. Humidification of each raw material gas was performed by passing the gas through a bubbler, a water temperature of the bubbler for hydrogen was adjusted to 80° C., and a water temperature of the bubbler for the air was adjusted to 80° C. Herein, a gas flow rate of hydrogen was 529 mL/min, and a gas flow rate of the air was 1665 mL/min. And, a value at which a current density became 0.2 A/cm$^2$ was measured, to assess electric generation performance of a cell of each fuel cell. As a cell voltage is higher, it is indicated that electric generation performance of a cell of a fuel cell is excellent in electric generation performance.

Reference Example 2-1

Case of Using Nafion Solution

In Example 2-1, an electrode was formed on a cathode side as on an anode side, and electric generation performance was assessed.

Comparative Example 2-1

According to the same manner as that of Example 2-1 except that dialysis was not used, electric generation performance was assessed.

TABLE 2

| | Electric generation performance (cell voltage at 0.2 A/cm$^2$) |
|---|---|
| Example 2-1 | 0.773 V |
| Reference Example 2-1 | 0.813 V |
| Comparative Example 2-1 | 0.437 V |

The invention claimed is:

1. A process for producing a polymer electrolyte emulsion comprising separating a polymer electrolyte dispersion in which a polymer electrolyte particle is dispersed in a dispersing medium, with a membrane
   wherein the polymer electrolyte dispersion is obtained through the following steps:
   (1) dissolving a polymer electrolyte in a solvent comprising a good solvent for the polymer electrolyte to prepare a polymer electrolyte solution; and
   (2) mixing the polymer electrolyte solution obtained in (1), and a poor solvent for the polymer electrolyte.

2. The process according to claim 1, wherein the membrane is a dialysis membrane or an ultrafiltration membrane.

3. The process according to claim 1, wherein the membrane is a dialysis membrane.

4. The process according to claim 1, wherein a polymer electrolyte contained in the polymer electrolyte particle is a polymer electrolyte in which a content of a fluorine atom in its elementary composition is 15% by weight or less.

5. The process according to anyone of claims 1 to 3, wherein the good solvent is at least one kind selected from the group consisting of N-methyl-2-pyrrolidone, N,N-dimethylacetamide, N,N-dimethylformamide and dimethyl sulfoxide.

* * * * *